United States Patent [19]

Fuchs

[11] Patent Number: 4,543,991

[45] Date of Patent: Oct. 1, 1985

[54] ELECTROMAGNETIC DOUBLE-VALVE FOR CONTROLLING THE FLOW OF TWO DIFFERENT MATERIALS

[75] Inventor: Franz Fuchs, Ottobrunn, Fed. Rep. of Germany

[73] Assignee: Messerschmitt-Boelkow-Blohm Gesellschaft mit beschraenkter Haftung, Munich, Fed. Rep. of Germany

[21] Appl. No.: 522,643

[22] Filed: Aug. 11, 1983

[30] Foreign Application Priority Data

Aug. 13, 1982 [DE] Fed. Rep. of Germany ....... 3230162

[51] Int. Cl.$^4$ .............................................. F16K 31/10
[52] U.S. Cl. ................................. 137/595; 137/637.1; 137/868; 251/65; 251/85; 251/129.21
[58] Field of Search ............... 137/595, 597, 637.1, 137/867, 868; 251/139, 65, 141, 85, 87

[56] References Cited

U.S. PATENT DOCUMENTS

| | | | |
|---|---|---|---|
| 1,965,054 | 7/1934 | Powers | 251/141 |
| 3,499,463 | 3/1970 | Trott et al. | 137/595 |
| 3,570,807 | 3/1971 | Sturman | 251/65 |
| 3,661,178 | 5/1972 | Wichmann | 137/595 |
| 3,751,001 | 8/1973 | Rayment | 251/141 |
| 4,225,111 | 9/1980 | Stähle | 251/87 |
| 4,428,188 | 1/1984 | Turansky et al. | 137/595 |

Primary Examiner—Martin P. Schwadron
Assistant Examiner—Stephen M. Hepperle
Attorney, Agent, or Firm—W. G. Fasse; D. H. Kane, Jr.

[57] ABSTRACT

An electromagnetic double-valve can synchronously regulate or control the flow of two materials without the need of a costly mechanical linkage between the two individual valves which may be arranged in a common housing. An armature serves as the valve body or plug in each valve and is held in one valve position by permanent magnets and is switched to the other valve position by a synchronously controlled electromagnetic coil or coils which are connected in series. When one armature is lifted quicker than the other by the electromagnet or magnets, then the total magnetic flux decreases, whereby the second armature is also lifted. The synchronization of the switching operation is enforced by the common, spacially closed magnetic flux through both armatures and by the common effect on both armatures by the electromagnetic coil or coils.

12 Claims, 3 Drawing Figures

ELECTROMAGNETIC DOUBLE-VALVE FOR CONTROLLING THE FLOW OF TWO DIFFERENT MATERIALS

BACKGROUND OF THE INVENTION

The invention relates to an electromagnetic double-valve having two valves which are electrically controllable in synchronism with each other for controlling the flow of two materials.

Such double-valves are used, for example, in the positioning control system of satellites for the closed loop position control of such satellites. The double-valve has, in a common housing, two valve members which are synchronously electrically controllable. Each of the two valves serves to control the flow of one of the two materials. On the outlet side the two valves may be connected to each other, the outlet conduits for example, are joined and lead into a reaction chamber of a positioning drive mechanism of the satellite. In each of the two valves of the double-valve, an armature serves as the valve body or moving valve plug held in a defined valve position, for example in the closed position of the valve, by means of a magnet. Electromagnets are provided for both valves to transport the armature or valve plug into the other defined valve position, in this case the open position. These electromagnets are actuated by a control current.

The synchronous function of the two individual valves is essential for the satisfactory and acceptable function of such a double-valve. In the described example embodiment of a double-valve for controlling a satellite positioning drive mechanism, this means that both valves must be opened simultaneously and also closed simultaneously. This requirement has been typically achieved heretofore by mechanically linking the two valve bodies of the individual valves. However, such a solution is costly. The lack of such a mechanical linkage causes a considerable deviation from the desired simultaneous switching of both valves for opening and closing because of the differing mechanical and physical parameters within the individual valves. In those instances which depend upon a highly accurate synchronous function, these valves do not satisfy the desired requirements.

OBJECTS OF THE INVENTION

In view of the above it is the aim of the invention to achieve the following objects singly or in combination:

to further develop a double-valve of the type described above so that a highly synchronous function of both single material valves in the double-valve is achieved without a costly mechanical linkage;

to make sure that both valves are controlled by the same magnetic force; and to operate the two valves in such a way that the function of one valve enhances the simultaneous and corresponding function of the other valve and vice versa.

SUMMARY OF THE INVENTION

According to the invention there is provided an electromagnetic double-valve for controlling the flow of two materials by means of two synchronous, electrically controllable, individual valves each of which serves for controlling the flow of one of the two materials and each comprising an armature forming the valve body or movable valve plug controlled by a magnet located in the armature magnetic circuit to hold the armature in a defined position, and by an electromagnet for moving the armature into the other defined valve position when a control current is applied to the electromagnet coil, wherein the magnetic circuits of the two single valves, which conduct the magnetic flux of the respective magnets are connected in series with each other so that the total magnetic flux of both valves passes through a single, spacially closed loop.

Thus, the essential teaching of the invention makes sure that the magnetic flux of the permanent magnets, which hold the two valves in a defined valve position, is connected or passed through both armatures in a quasi-series manner so that both armatures lie in a common magnetic flux field. Then, when one armature is lifted by controlling of the electromagnets, the total magnetic flux is decreased considerably, whereby the second valve is also switched. If the magnets hold the valves in the closed position, as is typical, then the strength of the closing force of the second armature is diminished because the magnetic flux is interrupted when the first armature is lifted for opening the valve. Such flux interruption enhances the switching process. A similar effect occurs during the shifting of the valve into the other defined position, that is, the closed position. Namely, when a valve closes, the magnetic flux circuit is closed whereby the flux is strengthened so that the closing-force of the other valve magnet is considerably increased, which instantly closes the other valve too. Such a valve construction achieves a highly synchronous switching operation of the double-valve without the need of a costly mechanical linkage.

The windings of the electromagnets are preferably also electrically connected in series so that the two valves have the same ampere winding or ampere turns number.

An especially advantageous embodiment of the present valve is provided if the armatures of the two single valves are supported in the valve housing with short tilting paths. Two wedge-shaped permanent magnets, whose magnetic flux encompasses both armatures, project between the upper regions of the two armatures and hold the individual valves in the closed position. Both armatures can be synchronously switched into the other tilt-position, in which both individual valves are open, by means of an electromagnetic coil encompassing the upper regions of both armatures. The synchronization of the switching operation is insured, on the one hand, by the common magnetic flux through both armatures, as mentioned above, and on the other hand, by the common effect on both armatures by the single electromagnetic coil provided for both magnets in common.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
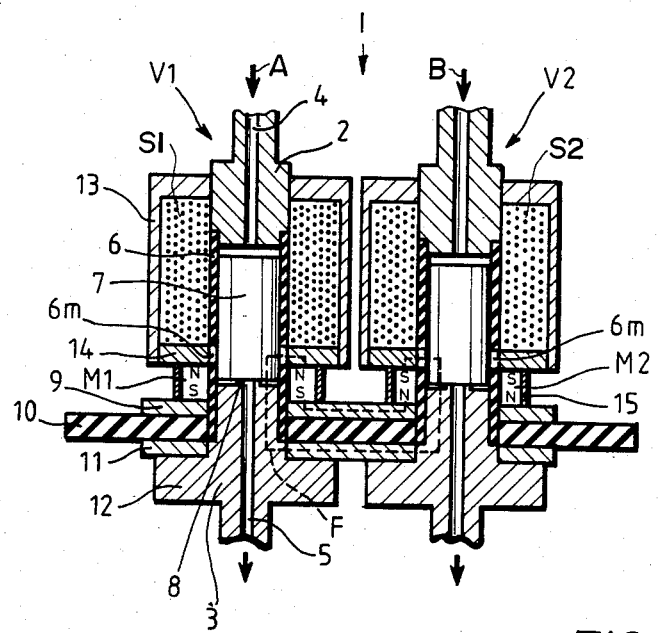
FIG. 1 is a schematic cross-section through a first example embodiment of a double-valve according to the invention.

FIG. 1 shows an electromagnetically controllable double-valve 1 comprising two individual valves V1 and V2. Both individual valves are constructed identically so only valve V1 will be described. The housing of the individual valve V1 comprises an upper housing plug 2 and a lower housing plug 3. The plug 2 is provided with a supply conduit 4 for a first material A. The plug 3 is provided with an outlet conduit 5. The conduits 4 and 5 extend centrally and longitudinally, whereby the supply and outlet conduits are coaxial or rather in axial alignment. The two plugs are connected by a casing or sleeve 6 which, for the most part, is not magnetically conducting. A cylindrical armature 7 is slidably supported in the interior space of this casing 6. The lower face of the armature or valve plug 7, facing the housing plug 3, is constructed as a seat cooperating with the valve seat 8 at the upper end of the outlet conduit 5. When the lower cylinder face of the armature 7 rests on this valve seat 8, as shown in FIG. 1, the valve V1 is closed. When the armature 7 is lifted upwardly off the seat 8 and rests its upper cylinder face against the aperture or mouth of the supply conduit 4, then material A can stream through flow openings in the armature (not shown in the drawings) from the supply conduit 4, through the armature 7, to the outlet conduit 5 and out.

The second identically constructed individual valve V2 is aligned in parallel to the first and serves to control the flow of a second material B.

The two single valves are held in the closed position, as shown in FIG. 1, by a ring-magnet M1 and a ring-magnet M2. These ring-magnets surround the magnetically non-conductive casing 6, in the upper edge region of the lower housing plug 3, so that they exert a magnetic force on the armature 7 in the direction of the valve seat 8 to normally keep the valves closed. Both ring-magnets are magnetized axially, whereby the north pole N of the ring-magnet M1 is located at the upper side, and the north pole N of the ring-magnet M2 is located on the lower side. Both ring-magnets are supported on a common, magnetically conducting, first yoke plate 9 provided with cutouts for the casing 6 and for the housing threaded plug 3. The plate 9 magnetically connects the south pole S of the first ring-magnet M1 with the north pole N of the second ring-magnet M2. An insulating spacer plate 10, which is constructed like the yoke plate 9, but is not magnetically conducting, is arranged below the first yoke plate 9 and rests against a second yoke plate 11 which is constructed of a magnetically conducting material like the first yoke plate 9. This lower second yoke plate 11 is held by flanges 12 of both lower housing plugs 3.

A cylindrically shaped housing 13 of magnetically conducting material rests against the upper side of each of the ring-magnets M1 and M2, and surrounds the casing 6 and a portion of the upper housing threaded plug 2. Each housing 13 encloses its respective electromagnetic coil S1 and S2. The lower wall of the housing 13 resting against the respective ring-magnet is shown at 14. In the region in which this housing wall 14 surrounds the respective casing 6, the casing comprises a magnetically conducting material shown at 6m. The electromagnetic coils S1 and S2 are synchronously supplied with a control current by means of a control circuit which is not shown in the drawings since it is conventional.

The described double-valve functions as follows, when the coils S1 and S2 are not excited or energized by a control current, the two armatures 7 of the individual valves V1 and V2 are pressed against the valve seats 8. The magnetic flux F through the armature circuit is indicated by a dashed line in FIG. 1. The magnetic flux F originates in the north pole of the ring-magnet M1, passes through the lower housing wall 14, the armature 7, and then through the lower housing plug 3 of the magnetic valve 1. Additionally, the flux passes through the second yoke plate 11, into the lower housing plug of the second valve, then through the second armature, the second lower housing wall, to the south pole of the second ring-magnet M2 of the second individual valve. Finally, the flux passes from the north pole of ring-magnet M2, through the upper first yoke plate 9, and to the south pole of ring-magnet M1. It can be seen from this, that a common, spacially closed, magnetic flux is enforced for both valves.

When both coils S1 and S2 of the two single valves V1 and V2 are synchronously energized, the armature 7 of the first valve V1, for example, lifts up first. This, however, causes the magnetic flux at the interface between the lower cylinder surface of the armature 7 and the upper end surface or seat 8 of the lower housing plug 3, to weaken whereby the magnetic flux through the second valve V2 is synchronously weakened. This switches the second valve V2, directly following the first valve V1, in a quasi-synchronous manner, so that the armatures are synchronously moved in the direction toward the aperature or mouth of the supply conduit 4 to open the valve.

If the controlling current for the two electromagnetic coils S1 and S2 is synchronously switched off, then the two armatures are pulled toward the valve seats 8 by the ring-magnets. If in this case, one of the armatures carries out its movement quicker or sooner than the other, then the magnetic flux is synchronously increased in both valves, so that the other armature is immediately pulled along, until both armatures are again resting on their respective valve seats 8. Each individual valve, and therefore also the complete double-valve, is now closed.

The two ring-magnets M1 and M2 are provided with a stray field screening 15 to avoid any effects of stray fields. Additionally, the coils S1 and S2 can be electrically connected in series, which is not shown in the figures.

The described magnetic coupling of the two single valves ensures a high synchronization of their function.

The armatures are shifted between the two valve settings along the axes of the two individual valves in the example embodiment of a double-valve as described in FIG. 1. In the double-valve 1' shown in FIGS. 2 and 3, the armature performs a tipping or tilting movement between the two valve settings, which utilizes the magnetic forces still more effectively.

Figure 2:
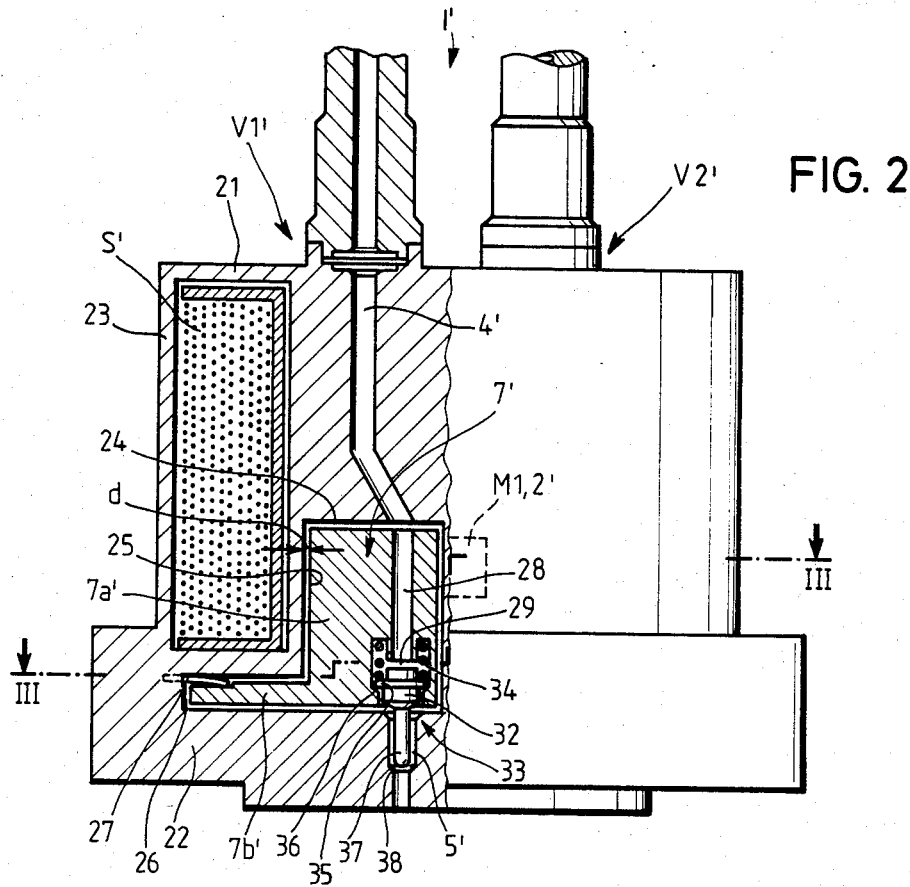
FIG. 2 shows a partial sectional view of a double-valve according to the invention in a second example embodiment.
Figure 3:
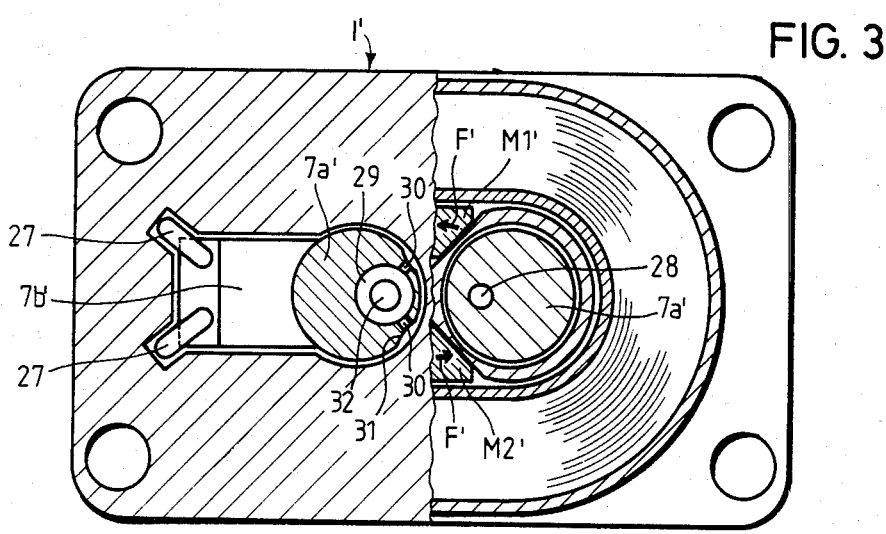
FIG. 3 is a partial section through the double-valve along the line III—III according to FIG. 2.

For reasons of clarity, the parts that are the same or have the same function in this example embodiment as in the example embodiment of FIG. 1 will be provided with the same reference numerals, but these numbers are provided with a prime (') in FIGS. 2 and 3.

The double-valve 1' has a housing 21 comprising a base plate 22 and a covering hood 23 having an approximately oval cross-section. Two individual valves V1' and V2' are arranged in the housing and are identically constructed so that the essential parts will again be described only for valve V1'. The parallel supply conduits 4' for the two valves are lead into the housing through the top side of the covering hood 23. These supply conduits 4' open into an inner valve chamber 24 formed by two axial bore holes, namely an upper bore hole 25 with a smaller diameter and a lower bore hole 26 with a larger diameter. An armature 7' having an L-shaped cross-section, comprising a first cylindrical armature part 7a' and a second platform-shaped armature part 7b', is arranged in this valve chamber 24. The armature part 7a' is supported to freely move with play "d" in the upper bore hole 25. The extension part 7b' of the armature, which extends outwardly in the lower bore hole 26, is fixed to the valve housing by means of two horizontally extending leaf springs 27. The armature 7' is therefore suspended solely by means of the leaf springs 27 as shown in FIG. 2 and can thus be tilted about the fastening point of the spring in the inner valve chamber 24 because of the play "d".

The armature 7' has an axial bore hole 28 in its cylindrical part 7a' so that a material may flow from the supply conduit 4' to the outlet conduit 5' of a valve. This bore hole 28 passes through the top armature surface in the region of the aperture or mouth of the supply conduit 4' and opens, at its other end, into a chamber 29 in the base of the armature 7'. Radial conduits 30 branch out from this chamber 29 and open into recesses 31 provided on the outer surface of the armature. A radial outlet conduit 5' is provided below the chamber 29 and a valve body, or plug 32 is provided in the chamber 29 to open and close the valve seat 33. The valve plug 32 is supported in the chamber 29 by a compression spring and has a shoulder 35 associated with a correspondingly constructed shoulder 36 at the lower end of the chamber 29. The valve body or plug 32 is connected to a valve pin 37 projecting into the outlet conduit 5' and cooperates with a correspondingly formed valve seat 38.

The valve V1' is open when the armature 7' in FIG. 2 is tilted to the left. In this case, the shoulder 35 of the closing body 32 rests against the shoulder 36 and the valve pin 37 is lifted off of the valve seat 38. A material can then stream through the supply conduit 4', through the bore hole 28 and the conduits 30 (FIG. 3) in the armature 7', and out of the outlet conduit 5'. To close the valve, the armature 7' is tilted to the right, so that the valve pin 37 rests on the valve seat 38. Upon further tilting, the shoulder 35 of the valve body or plug 32 is lifted off of the corresponding shoulder 36 of the chamber 29 and the valve body 32 with its valve pin 37 are pressed downwardly by the compression spring 34, so that the valve remains closed.

Instead of the described seat valve a valve of another type may be utilized as long as this valve can only be opened or closed when the armature is moved into the two tilt-positions.

The cylindrical armature parts 7a' of both valves V1' and V2', as well as the valve part located above these armatures, are surrounded by a common electromagnetic coil S'. The coil S' is switched on and off by means of a conventional control circuit arrangement not shown in the drawings. A wedge-shaped free space along each of the two long sides of the oval results from the oval winding shape of the coil winding. Two wedge-shaped permanent magnets M1' and M2' are inserted adjacent to the two armature members 7a' into these two free spaces. The wedge surfaces of these magnets rest directly against the components defining the bore holes 25 in the housing. The magnets cover, at least partially, in their axial extension, the cylindrical armature parts 7a' projecting into these bore holes 25. The permanent magnets are radially magnetized and have a joint effect on both armatures 7' of the two individual valves V1' and V2'. The magnetic flux F' through the two armatures 7' is shown schematically by dashed lines in FIG. 3. Starting at the north pole on the wedge side of the magnet M1', the magnetic flux passes through the armature 7' of the first single valve V1', from there to the south pole of the oppositely arranged magnet M2', from the north pole thereof through the armature 7' of the second single valve V2' and from there back to the south pole on the second wedge surface of the permanent magnet M1'. Here too, it can be seen that for both armatures there is a common magnetic flux flowing in a series circuit, so to speak.

When the magnetic coil S' is not switched on, the armatures are attracted by the magnets M1' and M2' and tilt about their respective pivot points at the leaf springs 27, in the direction toward the magnets. The seat valve 33 is thereby closed so that the valve plugs 32 are resting against the respective valve seats 38. If the magnetic coil S' is actuated or energized, then both armatures 7' tilt outwardly in the direction of the electromagnet formed by the magnet coil S'. This causes the seat valves 33 of both individual valves to be lifted off the seats 38. The synchronization of the opening and closing motions of the two single valves is made possible by the magnetic coupling of the two valves by means of the permanent magnets, as in the first example embodiment. The electromagnetic forces affect both armatures synchronously and with equal force because of the common magnetic coil S'.

Although the invention has been described with reference to specific example embodiments, it will be appreciated, that it is intended to cover all modifications and equivalents within the scope of the appended claims.

What is claimed is:

1. An electromagnetic double-valve for controlling the flow of two materials, comprising first and second individual valves each serving for the flow control of the respective material, valve housing means, first and second armature means including valve plug means in the respective housing means of each individual valve, first magnet means operatively arranged for holding the valve plugs in one defined position, second electromagnet means including electric coil means operatively arranged for shifting the plugs into the other defined valve position in response to applying a control current to said electric coil means, said armature means of said individual valves being arranged in said valve housing means for tilting about a respective tilting axis into two defined tilting positions corresponding to said defined valve positions, said first magnet means comprising permanent magnet means arranged for tilting said armature means into one of said defined positions, said electromagnet means comprising a single electromagnet arranged for tilting both said armature means into the other of said defined position, and wherein the magnetic flux (F') of said first magnet means jointly encompasses both armature means (7') of the individual valves (V1', V2'), and wherein said valve housing means comprises two bore holes (25) for holding said first and second armature means, said bore holes having axes extending in parallel to each other with the holes arranged adjacent to each other, said armature means having a cross-sectional dimension smaller than the respective hole to provide a play (d) between the armature and the bore hole for permitting said tilting of said armature means in the respective hole, and wherein said permanent magnet means are shaped to fit into respective spaces bounded by said adjacent holes in said valve housing means, said permanent magnets being arranged opposite each other and having cyclically magnetized surfaces resting against the housing means next to said bore holes.

2. The double-valve of claim 1, wherein said electric coil means of said single electromagnet comprise a single magnetizing coil.

3. The double-valve of claim 1, wherein said valve plug means form a separate part (32) at one end of each of said first and second armature means.

4. The double-valve of claim 1, wherein said valve plug means comprises individual plug members (32) housed in the respective armature means (7') of the individual valves (V1', V2'), mounting means (27) tiltably mounting the respective armature means in said valve housing means, so that the armature means and the respective plug member can tilt and can assume two defined tilt-positions corresponding to an open and closed valve condition, said first magnet means holding said armature means (7') in a defined valve position, said first magnet means (M1', M2') being located remote from said mounting means for said tilting about said tilting axis.

5. The double-valve of claim 4, wherein said mounting means comprise leaf springs (27) for tiltably holding said armature means, and wherein said first magnet means comprise two permanent magnets (M1', M2') located remote from said mounting leaf springs (27) and cooperating with said mounting leaf springs.

6. The double-valve of claim 1, wherein said first and second armature means (7') of the two individual valves (V1', V2') are arranged adjacent to each other, said armature means being tilted toward each other in the valve closing position, and being tilted away from each other in the valve opened position.

7. The double-valve of claim 1, wherein said armature means (7') have an L-shaped configuration in an axial plane, wherein each bore hole comprises a cylindrical hole portion for housing one leg of the L-shaped armature configuration, and a further hole portion for housing the other leg of the L-shaped armature configuration, said valve further comprising leaf springs (27) for tiltably holding one of said legs of said L-shaped armature configuration, while the other leg of said L-shaped armature configuration faces said first magnet means, and wherein said spaces in said valve housing means are wedge shaped between said cylindrical hole portions, said permanent magnet means being respectively wedge-shaped to fit into said wedge-shaped spaces.

8. The double-valve of claim 7, wherein said leaf springs (27) are supported in the valve housing (21).

9. The double-valve of claim 4, wherein said valve plug members (32) are housed in an underside of the respective armature means (7') and remote from said mounting means, said valve housing means including a valve seat (33) arranged relative to an outlet conduit (5') for cooperation with the respective valve plug member.

10. The double-valve of claim 9, further comprising spring means (34) for biassing the respective valve plug member (32).

11. The double-valve of claim 1, wherein said armature means (7, 7') comprise flow openings (28, 30) for passing said material through the respective valve.

12. An electromagnetic double-valve for controlling the flow of two materials, comprising first and second individual valves each serving for the flow control of the respective material, valve housing means, first and second armature means including valve plug means in the respective housing means of each individual valve, first magnet means operatively arranged for holding the valve plugs in one defined position, second electromagnet means including electric coil means operatively arranged for shifting the plugs into the other defined valve position in response to applying a control current to said electric coil means, said armature means of said individual valves being arranged in said valve housing means for tilting about a respective tilting axis into two defined tilting positions corresponding to said defined valve positions, said first magnet means comprising permanent magnet means arranged for tilting said armature means into one of said defined positions, said electromagnet means comprising a single electromagnet arranged for tilting both said armature means into the other of said defined position, and wherein the magnetic flux (F') of said first magnet means jointly encompasses both armature means (7') of the individual valves (V1', V2'), and wherein said valve housing means comprise two cylindrical bore holes for holding said first and second armature means, said cylindrical bore holes being arranged adjacent to each other with the longitudinal hole axes extending in parallel to each other, said armature means having a diameter smaller than the diameter of the respective cylindrical bore hole to provide a Play "d" between the armature and the bore hole for permitting said tilting of said armature means in the respective hole, and wherein said permanent magnet means are wedge-shaped to fit into respective spaces bounded by said adjacent cylindrical bore holes in said valve housing means and a plane extending substantially tangentially to both adjacent cylindrical bore holes, whereby said wedge-shaped permanent magnets are arranged opposite each other and have wedge forming, cyclically magnetized surfaces resting against the housing means next to said cylindrical bore holes.

* * * * *